Aug. 28, 1951  W. W. GASKELL, JR  2,565,767
AIR COOLER FOR MOTOR VEHICLES
Filed June 7, 1949  2 Sheets-Sheet 2
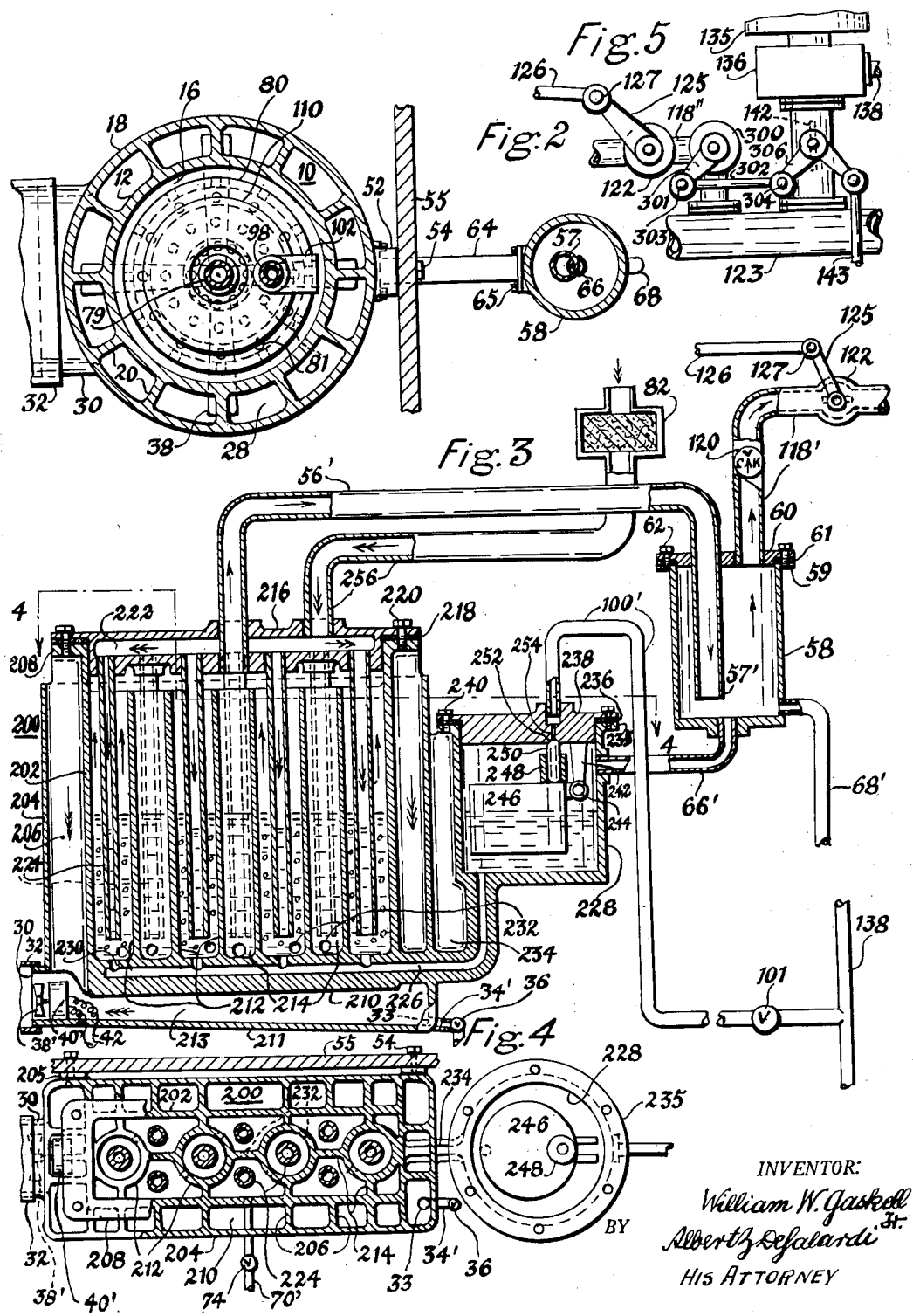
INVENTOR:
William W. Gaskell Jr.
BY Albert Z. Defalardi
HIS ATTORNEY Patented Aug. 28, 1951

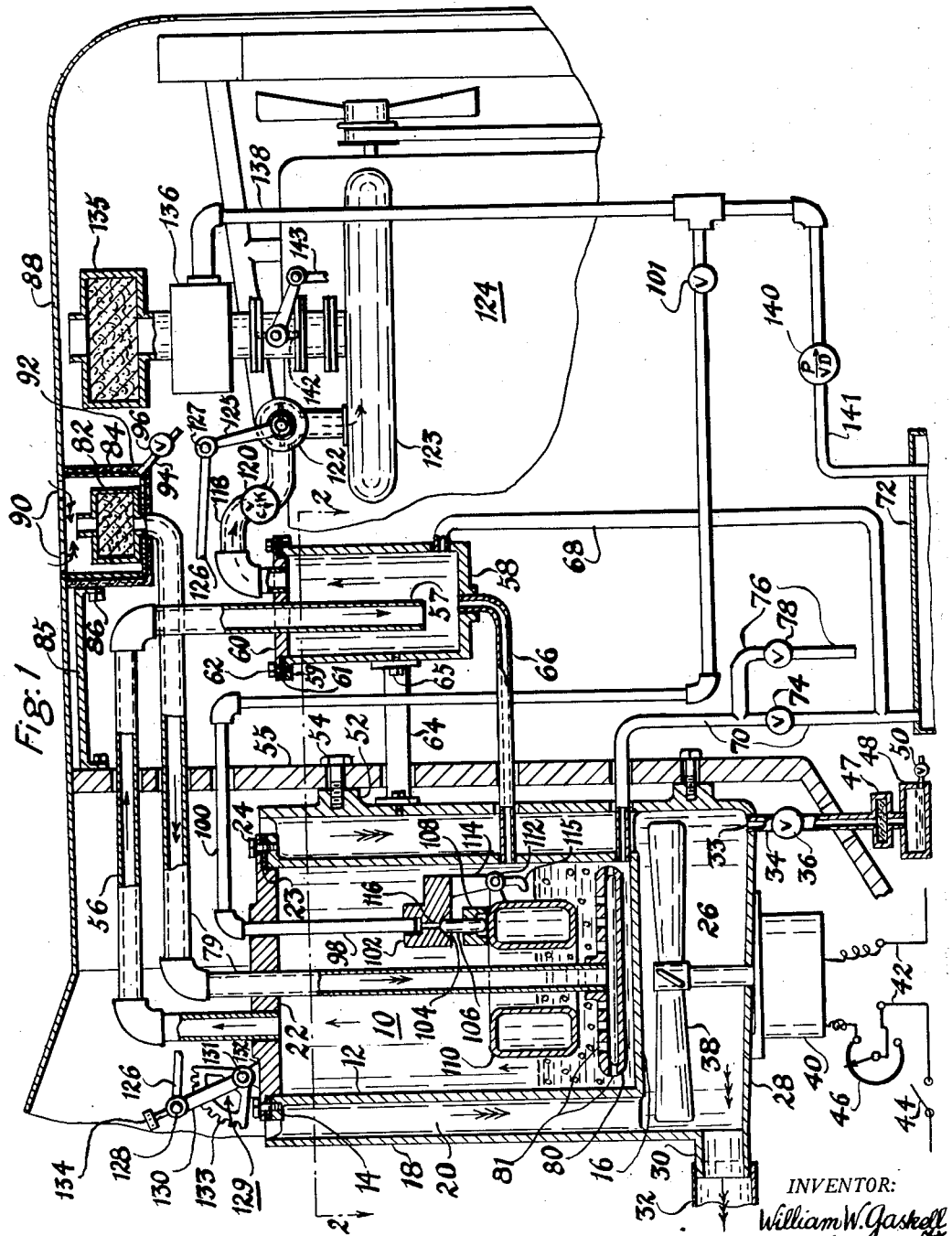

2,565,767

UNITED STATES PATENT OFFICE 2,565,767

AIR COOLER FOR MOTOR VEHICLES

William W. Gaskell, Jr., Penn Township, Allegheny County, Pa.

Application June 7, 1949, Serial No. 97,667

11 Claims. (Cl. 62—168)

This invention pertains generally to air cooling devices and more particularly to those which serve for lowering the temperature of the air within the closed bodies of motor vehicles driven by internal combustion engines.

One object of my invention is to provide an air cooler which volatilizes liquid motor fuel such as gasoline, alcohol, benzol, etc. in vacuum produced in an evaporation tank by the suction effect of the internal combustion engine thereby absorbing heat from the air surrounding the tank.

Another object is to create an air cooling device employing an evaporation tank supplied with a portion of the fuel consumed by the vehicle engine, into which fuel air is introduced under atmospheric pressure and the staurated air emerging therefrom is led into the suction manifold of the vehicle engine to be used as part of the charge.

Another object is to provide an air cooler of the type under consideration which is equipped with a jacketed evaporation tank having ribs connecting the inside and outside tank walls forming a cellular structure of relatively large surface area in order to efficiently cool the air between and adjacent said walls.

Another object is to create an air cooler having an evaporation tank in which air saturated with fuel vapors is moved vertically upwardly and the surrounding air moved downwardly thereby increasing the effectiveness of the heat exchange.

A further object is to create a cooling device of the character described that absorbs heat from the surrounding air by evaporating fuel in a tank in which it is kept at a predetermined constant level and drawing atmospheric air therethrough under vacuum and feeding the fuel vapor saturated air through regulator valves into the engine manifold for decreasing the excess fuel richness of the total charge supplied by the carburetor and the air cooler thereby increasing the fuel economy of the vehicle engine.

A still further object is to provide a device of the type set forth that reduces the humidity of the air by condensing part of the vapors carried thereby and has means for filtering and collecting the condensate as distilled water usable in the storage battery of the vehicle.

Another object is to create a vehicle body air cooler that evaporates fuel under vacuum in a tank communicating with the suction manifold of the engine of the vehicle and has at least one check valve to prevent back fire to reach the fuel in the evaporation tank.

Another object is to provide an air cooler for motor vehicles which employs an evaporation vessel storing fuel into which an air filter connected tubular intake member conducts the air from heat insulated chamber provided with selectively operative drainage means and communication with the atmosphere, leading it through the stored fuel therein thereby saturating the filtered air with fuel vapors and introducing the resulting mixture into the manifold of the internal combustion engine of the vehicle by its suction effect, as part of the charge; the vacuum in the evaporation vessel being used to promote evaporation of the fuel therein causing absorption of heat from the vessel and the adjacent air in the vehicle body; the purpose of the air filter being also to save the fuel from air-borne contaminating matter.

A further object is to create a cooler of the type mentioned in which fuel is vaporized in a vessel by an air stream caused by the suction effect of the vehicle engine and the produced air-fuel mixture is deliquified before introduction into the suction manifold by means that change abruptly the direction of its flow thereby separating the heavier droplets which then are returned to said vessel for repeated vaporization.

Another object is to provide a device of the character described which employs a fuel evaporation vessel having a cellular jacket and fan means to draw outside air with variable speed through said jacket for efficiently cooling it through heat exchange with said jacketed vessel.

Another object is to provide an air cooler for closed motor vehicles which is inexpensive in manufacture, safe in use and efficient in operation.

These and other objects will be apparent to those skilled in the art from the following description and the accompanying drawing in which:

Fig. 1 is a semi diagrammatic elevational view of the first preferred embodiment of my invention, showing in section the jacketed fuel evaporation tank mounted on a vertical partition or dash board of the motor vehicle the engine of which is illustrated in part only and indicating the suction manifold, carburetor, air filter, and supply piping arranged under a hood, the evaporation tank serving also as fuel level maintaining float compartment;

Fig. 2 is a plan view of a horizontal section taken on line 2—2 in Fig. 1 and showing the evaporation tank and the surge tank with their internal equipment;

Fig. 3 is the elevational sectional view of the second preferred embodiment of my invention showing a jacketed evaporation tank connected to an exterior float chamber and a surge tank;

Fig. 4 is a plan view, chiefly in section, taken on broken line 4—4 in Fig. 3 and showing the evaporation tank and the float chamber, the latter with its cover removed;

Fig. 5 is a partial elevational view of the charge control device of a third preferred embodiment of my invention differing from the controls of the previous two embodiments in that respect that the previously independent control devices for the charges supplied by the carburetor and by the evaporation tank, respectively, are here interconnected so that the control of the carburetor throttle valve automatically controls a valve for the fuel vapor saturated air from the evaporation tank, the latter having also an independent control valve.

Identical parts are designated by the same reference numerals throughout the several views of the drawing while structural elements differing only in dimensions but serving the same purpose are marked with primed numerals.

Referring closer to Figures 1 and 2, representing the first preferred embodiment of my invention, 10 is the evaporation tank in general which is shown to be a vertical jacketed cylindrical vessel having internal wall 12 provided with circular flange 14 adjoining its top portion and with bottom plate 16, its external wall 18 being connected to the internal wall 12 by preferably radial ribs 20.

A suitable cover 22 with gasket 23 is sealingly fastened by screws 24 to flange 14 airtightly closing the evaporation tank 10. Below bottom plate 16 and within outer wall 18 a header compartment 26 is provided for collecting the cooled air which compartment has a preferably sloping bottom 28. An outlet spout 30 conducts the cooled air from compartment 26 through an attached suitable conduit 32 (shown broken away) which snugly fits outlet spout 30 and may have any desired shape and dimensions to direct the cooled air to desired locations within the vehicle body.

At the lowest point of the header compartment 26 a drain opening 33 is provided in which drain pipe 34, having valve 36, is sealingly fastened. Fan 38 is accommodated in compartment 26 and rotatably mounted by variable speed electric motor 40 which is preferably mounted outside the compartment 26. Motor 40 receives electric current from an outside source such as the storage battery (not shown) of the vehicle through leads 42 and switch 44. A rheostat or similar speed regulating device 46 is provided for changing the speed of motor 40. Drain pipe 34 empties into filter 47 communicating with distilled water reservoir 48 for the condensed and filtered water. Through drain valve 50 the distilled water can be released for possible use in the storage battery of the vehicle.

Outside wall 18 of evaporation tank 10 is provided with lugs 52 having threaded holes for screws 54 for mounting the tank on a suitable stationary part of the vehicle body such as dash board 55. Aspirator piping 56, one open end of which is fastened onto cover 22 reaches with its other, vertically downwardly extending end 57 into surge tank 58 which is preferably cylindrical and is provided at its top portion with a circular flange 59 to which cover 60 and gasket 61 are sealingly attached by suitable means such as screws 62, shown. A rigid support such as bracket 64, shown, fixes surge tank 58 to evaporation tank 10 to form one unit; the bracket 64 being fastened to the tanks by suitable attachment means such as screws 65. It is obvious that the tanks may be formed as one integral piece. Drain pipe 66 connects the bottom of surge tank 58 to the middle region of evaporation tank 10 while overflow pipe 68 leads from the bottom portion of surge tank 58 to pipe 70 which connects the bottom portion of evaporation tank 10 to the fuel reservoir 72 of the motor vehicle. Valve 74 serves to open or close, respectively, the pipe 70 which has also a branch line 76 leading toward the ground and is regulated by valve 78 for draining possibly contaminated fuel occasionally from evaporation tank 10. Pipe branch 76 and valve 78 constitute fuel drainage means for evaporating tank 10 bypassing fuel tank 72 of the vehicle, hence, to these I refer to as: "bypass fuel-drainage means." The vertical locations of the tanks is such that surge tank's bottom is somewhat higher than the fuel level in the evaporation tank allowing fuel collecting in the former to drain into the latter.

Air intake piping 79 is mounted on cover 22 and reaches through it with one of its end portions close to the bottom plate 16 of tank 10; it is provided at its low end with a diffuser head 80 having holes 81 on its upper and side surfaces. The outer end of air intake piping 79 is connected to air filter 82 of any approved design which is accommodated in compartment 84 held by bracket 85 rigidly fastened to dash board 55 by screws 86.

Hood 88 covers the engine region of the motor vehicle and snugly fits the open top of chamber 84 which communicates with the atmosphere through holes 90 in hood 88. Chamber 84 is encased in heat insulating covering 92 in order to keep the temperature of the air within it substantially equal to that of the outside atmosphere. At the bottom portion of chamber 84 a drain pipe 94 is arranged having valve 96. Intake pipe 79 communicates with chamber 84 only through filter 82 to prevent any contamination of the fuel in evaporating tank 10 by dust or other air-born impurities; hence, chamber 84, filter 82, drain pipe 94 and valve 96 are essential parts of the invention and are included in the "intake means."

Airtightly fixed into cover 22 is a tubular bar or pipe nipple 98 reaching downwardly inside of the tank 10 and is outwardly connected to fuel supply piping 100 provided with valve 101. At the lower end of nipple 98 sealingly fixed thereto is valve block 102 having valve seat 104 that coacts with a suitably shaped valve stem 106 slidingly arranged in sleeve 108 fastened to float 110 which is fulcrumed at 112 to lugs 114 forming an integral part of valve block 102. Stop 115 limits the downward amplitude of the oscillations of float 110. Duct 116 in valve block 102 connects valve seat 104 with pipe nipple 98. These parts and pump 140 I include in "supply means." 118 is the charge delivery pipe sealingly fixed into cover 60 of surge tank 58 and leading through check valve 120 and regulating valve 122 into the manifold 123 of the engine generally designated by 124 (shown broken away) of the motor vehicle. The control arm 125 of regulating valve 122 is connected by link 126 (shown broken away) fulcrumed at 127 and 128, respectively, to hand regulator, generally denoted by 129, its lever 130 oscillating around pin 131 mounted in bracket 132 which is fixed to a suitable stationary part such as cover 22. A toothed segment 133 is rigidly attached to bracket 132 for coacting with spring loaded pawl 134 locking valve 122 in any desired position. Hand regulators of this kind are well known and may be obtained readily on the market, hence, further detailed description and illustration of it is unnecessary. A conventional air filter 135 is attached to carburetor 136 of known and approved design which is connected by fuel supply piping 138 to variable delivery pump 140 connected by suitable pipe line 141 to the fuel reservoir 72 of the motor vehicle. By suitable throttle valve 142 controlled by conventional linkage 143 (shown broken away) the operator regulates the main fuel and air charge entering from the carburetor 136 the intake manifold 123 of engine 124.

The above described first embodiment of the invented air-cooler operates as follows:

Fuel pump 140 driven by engine 124 delivers fuel through piping 138 into carburetor 136 and also through open valve 101, piping 100 and pipe nipple 98 into duct 116 of valve block 102 located in tank 10. Until the normal fuel level is reached, the float 110 is oscillated downwardly around fulcrum pin 112 and valve stem 106 is separated from seat 104 admitting fuel into evaporation tank 10. When the predetermined normal level is reached valve stem 106 closes duct 116 cutting off further fuel supply. When engine 124 is in operation vacuum is produced in intake manifold 123 and air is drawn through charge delivery pipe 118, surge tank 58 and aspirator piping 56 from the interior of evaporation tank 10 in the direction of the single headed arrows. Thus in the evaporation tank 10 vacuum is produced drawing atmospheric air through hood openings 90, compartment 84, filter 82, air intake piping 79, diffuser 80 and holes 81 through the fuel supply tank 10 (as shown by double headed arrows), this air becoming saturated with fuel vapors. According to the law of communicating vessels the fuel level inside intake pipe 79 will be equal to that in evaporating tank 10 before operation and somewhat lower during operation, the niveau difference being proportional to the respective pressure difference. The fuel in tank 10 is subjected to accelerated evaporation due to the vacuum therein; the fuel vapors, droplets and air mixture, passes through the aspirator piping 56 and 57 into surge tank 58 in a downward flow which is suddenly reversed upwardly. Due to this 180° change of flow direction the heavier fuel droplets will separate from the air and collect at the bottom of surge tank 58 from where they are drained through pipe 66 into evaporation tank 10. The purpose of the separation of the heavier fuel droplets from the fuel vapor and air (called deliquification) is to subject the droplets to repeated vaporization in the tank and also to furnish a leaner fuel-air mixture for the engine. From surge tank 58 the fuel and air mixture is drawn through charge delivery pipe 118, check valve 120 and regulating valve 122 into the manifold 123 where it mixes with the main charge coming from carburetor 136 and with it enters the cylinders of the engine 124 for combustion.

Overflow pipe 68 guards against flooding of the surge tank 58 through failure of valve stem 106 to close duct 116 for any reason (breakage of float and valve mechanism, solid particles in fuel, etc.), in such case the overflowing fuel is returned through pipes 68 and 70 to the fuel reservoir 72 of the vehicle.

The control of the vapor saturated air stream drawn from evaporation tank 10 into the manifold 123 is effected by setting lever 130, of hand regulator 129, link 126 and with it control arm 125 of regulator valve 122 according to need.

Check valve 120 prevents any back fire in the manifold 123 to reach surge tank 58 and evaporation tank 10. Heat insulated compartment 84 accommodating air filter 82 is tightly covered by hood 88. It serves the purpose that heated air from the engine region of the vehicle should be prevented from entering air filter 82; furthermore, if fuel should be ejected through the air intake piping 79 and air filter 82 from evaporation tank 10 due to failure of the check valve 120, this fuel should be isolated from the engine region as well as from the interior space of the body of the vehicle. Thus compartment 84 decreases fire hazard and increases safety of the operator and passengers. Several check valves may be employed.

Evaporation tank 10 may be drained of fuel through piping 70 and valve 74 into the fuel reservoir 72 of the vehicle, or, by closing valve 74 and opening valve 78, through branch pipe 76 into a waste receptacle (not shown).

The air in the body of the vehicle enters the spaces separated by ribs 20 in the evaporation tank jacket between inner wall 12 and outer wall 18 due to the suction effect of fan 38 and moves downwardly accelerated by its increasing specific weight. Walls 12 and 18 and ribs 20 are dimensioned suitably to offer a sufficiently large area for efficient heat exchange. The downwardly flowing cooled air (moving in the direction of triple headed arrows) is forced through outlet spout 30 into duct 32 and conducted to points determined by end openings thereof arranged in the vehicle body.

Fan driving electric motor 40 is of the variable speed type receiving electric current through leads 42 from the storage battery (not shown) of the vehicle. The speed of the motor and that of the fan can be conveniently regulated by setting rheostat or other known regulator 46. Increasing the speed of motor 40 the velocity of the downward air current in the tank jacket and with it the rate of the transfer of heat between evaporation tank 10 and the cooled air is increased; slowing down motor 40 will have the opposite effect. It will be noted that the fuel vapor saturated chilled air inside the evaporation tank 10 moves upwardly in opposite direction to that followed by the air cooled in the jacket, hence their relative velocities are increased and with it the efficiency of the cooling.

When engine 124 is idling regulator valve 122 is preferably set to a smaller opening, while running the engine at high speed by opening throttle 142 necessitates the full opening of regulator valve 122. The latter setting will not only produce a greater air cooling effect in the vehicle body but will also reduce the fuel richness of the total charge entering the cylinders which is generally excessive when the engine is running above medium speed. Such a correction of the charge will result in fuel saving in the operation of the vehicle.

The constant draining of the water condensate from the header compartment 26 through drain pipe 34 results in a partial dehumidifying of the air delivered at spout 30 which—in combination with the effected cooling—gives a unitary result close to air conditioning of the body space of the vehicle. As a byproduct of this air dehumidifying distilled water is produced and collected by means of filter 47 and reservoir 48 which distilled water may be used for replenishing the storage battery of the vehicle.

Figures 3 and 4 show the second embodiment of my invention which differs from the first embodiment chiefly in that it provides for a separate float chamber located outside of the evaporation tank.

The evaporation tank, generally designated by 200, has an internal wall 202 and an outer wall 204 connected by ribs 206. The internal wall 202 is provided at its top with a flange 208 and at the bottom with a plate 210 from which cylindrical tubular risers 212 upwardly protrude; these are connected by ribs 214 with each other and with the inner wall 202. Below plate 210 is a preferably sloping bottom 211 forming with outside walls 204 a header compartment 213 having a cooled air delivery spout 30 to which a snugly fitting conduit 32 may be connected.

Hollow cover 216 closes the open top of evaporation tank 200 and, with interposed gasket 218, is sealingly fastened to flange 208 by screws 220. The cavity 222 in cover 216 communicates with the inside of evaporation tank 200 by a series of downwardly protruding nozzles 224 the lower ends of which reach close to bottom plate 210 in which duct 226 is provided leading to the bottom of externally located float chamber 228. Holes 230 connect duct 226 to the inside of evaporation tank 200 and holes 232 in the bottom portions of the ribs 214 and of the risers 212, respectively, interconnect the spaces within evaporation tank 200. Rib 234 rigidly ties float chamber 228 to evaporation tank 200 as a unit. Float chamber 228 is an upwardly open cylindrical vessel having circular flange 235 at its top portion to which gasket 236 and cover 238 are airtightly fastened by screws 240. From cover 238 downwardly protrudes lug 242 carrying fulcrum pin 244 that oscillatably mounts float 246 having fixed thereto sleeve 248 slidingly accommodating valve stem 250 that coacts with valve seat 252 provided in cover 238. Fuel supply piping 100' is sealingly fixed at one end into cover 238 and communicates through duct 254 therein with valve seat 252. Piping 100' is provided with valve 101 and leads to the fuel feed line 138 connected to the variable delivery fuel pump 140 in same manner as is shown and described in connection with Figures 1 and 2.

Aspirator piping 56' leads sealingly through evaporation tank cover 216 and connects the inside of tank 200 to the inside of surge tank 58 into which it reaches by the end piece 57' fastened into cover 60. Drain pipe 66' connects surge tank 58 with float chamber 258 above the normal fuel level therein and overflow pipe 68' leads through drain pipe 70' (shown broken away) to the fuel reservoir in the same way as shown in Fig. 1.

Sealingly fastened to float chamber cover 60 is charge delivery pipe 118' which leads the fuel vapor-air mixture from surge tank 58 through check valve 120 and regulator valve 122 into suction manifold 123 in the same manner as illustrated in Fig. 1.

Air intake piping 256 connects cavity 222 in tank cover 216 and with it air nozzles 224 in evaporation tank 200 with air filter 82 accommodated in a heat insulated compartment 84 under the hood 88 exactly in the same manner as described with the first embodiment.

Omitted from Figures 3 and 4 and from their description are the following parts which are identical with the corresponding ones used in the first embodiment represented by Figures 1 and 2:

Insulated chamber 84 with its drain pipe 94 and valve 96, condensed water filter 47, distilled water reservoir 48 with tap valve 50, fuel drain branch pipe 76 and valve 78, rheostat or speed changer 46 and hand controller 129. All these parts are included in the combination forming the second preferred embodiment of my invention and they are assembled substantially in the same manner as shown in Figures 1 and 2.

In the header compartment 213, preferably within outlet spout 32 a fan 38' is arranged driven by variable speed electric motor 40' which receives current through leads 42, switch 44 and speed regulator 46 from the storage battery of the vehicle.

The drainage of fuel from evaporation tank 200 and float chamber 228 is effected by drain pipe 70' which, after opening valve 74, leads the fuel into fuel reservoir 72. If this fuel is contaminated it is allowed to go to waste by closing valve 74, opening valve 78 in branch pipe 76 which directs the contaminated fuel toward the ground. Branch pipe 76, valve 78, fuel reservoir 72 are not shown in Figures 3 and 4 as their arrangement is the same as those of the corresponding parts in Figure 1. The omission of these and above enumerated omitted parts serve the simplification of the drawing and should not be construed to mean their elimination from the combination representing the second embodiment of my invention.

The operation of the second preferred embodiment is in principle the same as that of the first: air is drawn from the atmosphere through chamber 84, air filter 82, air intake piping 256, cover cavity 222, nozzles 224 and the stored fuel into evaporation tank 200 and subsequently drawn out therefrom into manifold 123 through aspirator piping 56', surge tank 58, charge delivery pipe 118', check valve 120 and regulator valve 122. Also in this embodiment the fuel level within nozzles 224, risers 212 of evaporating tank 200 will be the same when the device is not in operation and their difference during operation will be proportional to the respective pressure differences. The air-fuel vapor stream is caused by the vacuum developed by the suction effect of internal combustion engine 124. This suction effect produces a vacuum in the evaporation tank 200 also promoting the volatilization of the fuel therein. In surge tank 58 the heavier fuel droplets are separated from the vapor-air mixture due to the sudden reversal of the direction of the flow; the collected fuel is returned from surge tank 58 through drain pipe 66' into float chamber 228. In this manner, identically to the first embodiment, the fuel vapor-air mixture is deliquified and drawn into manifold 123 where it mixes with the main charge coming through throttle valve 142 from carburetor 126, and afterwards enters, as part of the total charge, the engine cylinders for combustion. As the fuel vapor-air mixture from surge tank 58 is considerably leaner in fuel than the charge coming from carburetor 136, the richness of the latter increasing with increased speed of engine 124, the final mixture of the two charges will produce substantially the proper and most economical charge, the operator being able to set regulator valve 122 according to need.

The cooling and dehumidification of the air traveling downwardly in jacket of evaporation tank 200 in contact with inside wall 202, outside wall 204 and ribs 206 and delivered by spout 30 into conduit 32 is effected in the same way as in the first embodiment by the suction effect of fan 38' driven by electric motor 40'. The collection of distilled water is achieved in the same manner as shown in Figure 1 through drain pipe 34', valve 36, filter 47 and water reservoir 48.

Fig. 5 illustrates the third embodiment of the invented cooler which differs from the previously described ones only in the regulation of the flow of the fuel vapor-air mixture by the addition to the regulator valve 122 of a throttle valve 300 that is connected to, and operates in unison with, throttle valve 142 controlling the charge from carburetor 136 to manifold 123 of engine 124.

In this embodiment charge delivery pipe 118" connects surge tank 58 to manifold 123 and inserted in pipe 118" is throttle valve 300 having control arm 301 connected by link 302, fulcrumed by pins 303 and 304, to arm 306 of throttle valve 142 which is set by the operator through linkage 143. Throttle valves 142 and 300 are so arranged that when the one opens or closes the other one does the same. In case that there are more than one carburetor and/or more than one throttle valve 142 for the same engine the throttle valve 300 should operate in unison with the others.

The operation of the third embodiment of my invention is the same as that of the previously described embodiments except for the regulation of the fuel vapor-air mixture which is made automatic, responsive to the regulation of the conventional throttle valve 142 effected by the operator. Furthermore this instantaneous, automatic regulation is subjected to a basic or stationary adjustment of the flow of the fuel vapor-air mixture by setting hand regulator 129 and with it regulator valve 122.

In addition to the charge controlling mechanism shown in Figure 5 the third embodiment of my invention includes all the parts composing either the first or the second embodiment.

In all three embodiments the charge delivery pipes 118, 118' and 118", respectively, may have a branched connection to manifold 123 instead of the single one for more equally distributing the fuel vapor-air mixture therein.

The distilled water reservoir 48 may be heat insulated to retard evaporation of its contents in all three embodiments.

Although I have fully described and illustrated three specific embodiments of my invention I do not wish to be limited to these to the exclusion of equivalent structures. It will be, therefore, understood that various changes and modifications may be resorted to without departing from the spirit and scope of my invention, hence, what I claim as new and wish to secure by Letters Patent is all that is embraced by the appended claims:

1. Air cooler for motor vehicles, having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapors, deliquifying means for separating the heavier fuel droplets from said fuel vapor saturated air for returning them into said tank means, charge delivery means for introducing the deliquified fuel-air mixture into said manifold, regulator means for controlling the flow of said fuel-air mixture into said manifold and fan means for moving air adjacent to said tank means along its walls for cooling it by heat exchange therebetween, said intake means including a heat-insulated chamber communicating with the atmosphere and with said tank means and an air filter inserted between said chamber and said tank means to form a sole passage therebetween, whereby the fuel in said tank means is protected from air-borne contaminating matter.

2. Air cooler for a motor vehicle, having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapor, deliquifying means for separating the heavier fuel droplets from said fuel vapor saturated air for returning them into said tank means, charge delivery means for introducing the deliquified fuel-air mixture into said manifold, regulator means for controlling the flow of said fuel-air mixture into said manifold, fan means for moving air adjacent to said tank means along its walls for cooling it by heat exchange therebetween, drainage means for collecting the water condensed from the cooled air and reservoir means for preserving said collected condenser water, said tank means including a vessel having a jacket formed by an inner wall and an outer wall connected by ribs, said supply means including a float oscillatably arranged in the stored fuel and operating a fuel valve that is closed when the predetermined level of the fuel is reached, said intake means including at least one tabular member reaching in said vessel into the stored fuel and said charge delivery means including a check valve to prevent back fire from reaching said deliquifying and said tank means.

3. Air cooler for motor vehicles, having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapor, deliquifying means for separating the heavier fuel droplets from said fuel vapor saturated air for returning them into said tank means, charge delivery means for introducing the deliquified fuel-air mixture into said manifold, regulator means for controlling the flow of said fuel-air mixture into said manifold, fan means for moving air adjacent to said tank means along its walls for cooling it by heat exchange therebetween, drainage means for collecting the water condensed from the cooled air and reservoir means for preserving said collected condensed water, said tank means including a cylindrical closed vessel having a jacket formed by an inner wall and an outer wall connected by ribs, said supply means including a float oscillatably arranged in the stored fuel and operating a fuel valve that is closed when the predetermined level of the fuel is reached, said intake means including an air filter for cleaning the entering air and at least one tubular member reaching in said vessel into the stored fuel, said deliquifying means including a closed vessel into which the fuel vapor saturated air is introduced and guided to flow in abruptly changed direction, said charge delivery means including a check valve to prevent back fire from reaching said deliquifying and said tank means and said reservoir means including a water filter for retaining solids from the condenser water.

4. Air cooler for motor vehicles, having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapor, deliquifying means for separating the heavier fuel droplets from said fuel vapor saturated air for returning them into said tank means, charge delivery means for introducing the deliquified fuel-air mixture into said manifold, regulator means for controlling the flow of said fuel-air mixture into said manifold, fan means for moving air adjacent to said tank means along its walls for cooling it by heat exchange therebetween, drainage means for collecting the water condensed from the cooled air and reservoir means for preserving said condensed water, said tank means including a substantially vertical cylindrical closed vessel having a jacket formed by an inner wall and an outer wall connected by ribs and a header compartment communicating with said jacket at the bottom portion of said tank means, said supply means including a float oscillatably arranged in the stored fuel and operating the fuel valve that is closed when the predetermined level of the fuel is reached, said intake means including a heat insulated chamber communicating with the atmosphere and accommodating an air filter for cleaning the entering air and at least one tubular member reaching in said vessel into the stored fuel and carrying an air diffuser head provided with a plurality of holes to distribute the air in the stored fuel, said deliquifying means including a closed vessel into which the fuel vapor saturated air is introduced and guided to flow in abruptly changed directions, said charge delivery means including a check valve to prevent back fire from reaching said deliquifying and said tank means and said reservoir means including a water filter for retaining solids from the condensed water.

5. Air cooler for motor vehicles having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapor, deliquifying means for separating the heavier fuel droplets from said fuel vapor saturated air for returning them into said tank means, charge delivery means for introducing the deliquified fuel-air mixture into said manifold, regulator means for controlling the flow of said fuel-air mixture into said manifold, fan means for moving air adjacent to said tank means along its walls for cooling it by heat exchange therebetween, drainage means for collecting the water condensed from the cooled air and reservoir means for preserving said condensed water, said tank means including a substantially vertical closed vessel having a jacket formed by an inner wall and an outer wall connected by ribs and a header compartment communicating with said jacket at the bottom portion of said tank means, which also include tubular risers protruding upwardly through the stored fuel, said supply means including a float chamber communicating with said tank means and a float oscillatably arranged in said chamber and operating a fuel valve that is closed when the predetermined level of the fuel is reached, said intake means including an air filter for cleaning the entering air and a plurality of tubular members reaching in said vessel into the stored fuel, said deliquifying means including a closed vessel into which the fuel vapor saturated air is introduced and guided to flow in abruptly changed directions, said charge delivery means including a check valve to prevent back fire from reaching said deliquefying and said tank means and said reservoir means including a water filter for retaining solids from the condensed water.

6. Air cooler for motor vehicles according to claim 5 in which said intake means include a heat insulated chamber communicating with the atmosphere and accommodating an air filter for cleaning the entering air.

7. Air cooler for motor vehicles according to claim 1 in which said regulator means include a throttle valve tied to said engine throttle valve for simultaneous opening and closing, respectively.

8. Air cooler for motor vehicles according to claim 4 in which said regulator means include a throttle valve tied to said engine throttle valve for simultaneous opening and closing, respectively.

9. Air cooler for motor vehicles according to claim 5 in which said regulator means include a throttle valve tied to said engine throttle valve for simultaneous opening and closing, respectively.

10. Air cooler for motor vehicles having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapors, deliquifying means for separating the heavier fuel droplets from said fuel vapor saturated air for returning them into said tank means, charge delivery means for introducing the deliquified fuel-air mixture into said manifold, regulator means controlling the flow of said mixture thereinto and fan means for moving air adjacent to said tank means, along its walls for cooling it by heat exchange therebetween, said intake means including a heat insulated chamber communicating with the atmosphere and with said tank means, an air filter inserted between said chamber and said tank means to form a sole passage therebetween and selectively operative drainage means carried by said chamber whereby liquids may be discharged therefrom and the fuel in said tank means is protected from air-borne contaminating matter.

11. Air cooler for motor vehicles having an internal combustion engine provided with a carburetor connected to an intake manifold through a throttle valve, comprising tank means adapted to store liquid fuel, supply means for keeping the stored fuel at a substantially constant level, intake means for drawing air from the atmosphere under vacuum through the stored fuel into said tank means for saturating it with fuel vapors, deliquifying means for separating the heavier fuel droplets from said fuel vapor saturated air for returning them into said tank means, charge delivery means for introducing the deliquified fuel-air mixture into said manifold, regulator means controlling the flow of said mixture thereinto and fan means for moving air adjacent to said tank means, along its walls for cooling it by heat exchange therebetween, said intake means including a heat insulated chamber communicating with the atmosphere and with said tank means, an air filter inserted between said chamber and said tank means to form a sole passage therebetween, selectively operative drainage means carried by said chamber whereby liquids may be discharged therefrom and the fuel in said tank means is protected from air-borne contaminating matter, and bypass fuel-drainage means communicating with said tank means, for occasionally discharging the fuel from said tank means outside of the fuel container of said vehicle.

WILLIAM W. GASKELL, JR.

REFERENCES CITED

The following references are of record in the file of this patent:

UNITED STATES PATENTS

| Number | Name | Date |
| --- | --- | --- |
| 2,157,409 | Helfrecht | May 9, 1939 |
| 2,233,249 | Downs | Feb. 25, 1941 |
| 2,258,725 | Wilkinson | Oct. 14, 1941 |
| 2,259,950 | Downs | Oct. 21, 1941 |